(12) United States Patent
Liu et al.

(10) Patent No.: US 11,916,663 B2
(45) Date of Patent: Feb. 27, 2024

(54) SLOT FORMAT CONFIGURATION METHOD AND COMMUNICATIONS APPARATUS

(71) Applicant: HUAWEI TECHNOLOGIES CO., LTD., Guangdong (CN)

(72) Inventors: Fengwei Liu, Chengdu (CN); Lei Chen, Shenzhen (CN); Jing Qiu, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 433 days.

(21) Appl. No.: 17/213,287

(22) Filed: Mar. 26, 2021

(65) Prior Publication Data

US 2021/0218494 A1 Jul. 15, 2021

Related U.S. Application Data

(63) Continuation of application No. PCT/CN2019/108341, filed on Sep. 27, 2019.

(30) Foreign Application Priority Data

Sep. 28, 2018 (CN) .......................... 201811138766.0

(51) Int. Cl.
*H04L 1/00* (2006.01)
*H04W 72/0446* (2023.01)
(Continued)

(52) U.S. Cl.
CPC ....... *H04L 1/0006* (2013.01); *H04W 72/0446* (2013.01); *H04W 72/27* (2023.01); *H04W 88/14* (2013.01)

(58) Field of Classification Search
USPC .................................................. 455/450–455
See application file for complete search history.

(56) References Cited

U.S. PATENT DOCUMENTS

2012/0195252 A1  8/2012  Suga
2017/0265187 A1  9/2017  Chen et al.
(Continued)

FOREIGN PATENT DOCUMENTS

CN    102143594 A    8/2011
CN    104363597 A    2/2015
(Continued)

OTHER PUBLICATIONS

Nokia, Nokia Shanghai Bell, Resource allocation between backhaul and access links. 3GPP TSG RAN WG1 Meeting #94, Gothenburg, Sweden, Aug. 20-24, 2018, R1-1808580, 7 pages.
(Continued)

*Primary Examiner* — Suhail Khan

(57) ABSTRACT

Example embodiments of this application provide a slot format configuration method. The method includes: a second node sends first configuration information to a first node, where the second node is a parent node of the first node; the first node determines a slot format of each slot in a first set of slots based on the first configuration information, where the first set of slots includes slots that are used for communication between the first node and a third node in one or more periods, and the third node is a child IAB node of the first node or a terminal device served by the first node; and the first node modifies slot formats of some slots in the first set of slots to obtain modified slot formats of these slots.

16 Claims, 7 Drawing Sheets

(51) Int. Cl.
　　　*H04W 72/27*　　　(2023.01)
　　　*H04W 88/14*　　　(2009.01)

(56) References Cited

U.S. PATENT DOCUMENTS

2018/0035435 A1　2/2018　Gupta et al.
2018/0279304 A1　9/2018　Lee et al.

FOREIGN PATENT DOCUMENTS

| CN | 108111281 A | 6/2018 |
|---|---|---|
| CN | 108365936 A | 8/2018 |
| EP | 2424288 A1 | 2/2012 |
| EP | 3355642 A1 | 8/2018 |

OTHER PUBLICATIONS

Qualcomm Incorporated, IAB Resource Management. 3GPP TSG RAN WG1 Meeting #94, Gothenburg, Sweden, Aug. 20-Aug. 24, 2018, R1-1809444, 6 pages.
Office Action issued in CN201811138766.0, dated Sep. 3, 2021, 9 pages.
Lenovo et al.,"Discussion on resource partitioning for IAB network",3GPP TSG RAN WG1 Meeting #94bis R1-1810577,Chengdu, China, Oct. 8-12, 2018, Total 4 Pages.
3GPP TS 38.213 V15.2.0 (Jun. 2018);3rd Generation Partnership Project;Technical Specification Group Radio Access Network;NR;Physical layer procedures for control(Release 15);total 99 pages.
3GPP TS 38.214 V15.2.0 (Jun. 2018), 3rd Generation Partnership Project; Technical Specification Group Radio Access Network; NR; Physical layer procedures for data (Release 15), 95 pages.
3GPP TS 38.331 V15.3.0 (Sep. 2018);3rd Generation Partnership Project;Technical Specification Group Radio Access Network;NR; Radio Resource Control (RRC) protocol specification(Release 15); total 445 pages.
Alcatel-Lucent et al.,"PRACH for LC-MTC", 3GPP TSG RAN WG1 Meeting #80bis R1-151234,Belgrade, Serbia, Apr. 20-24, 2015, total 4 pages.
ZTE et al.,"WF on NB-RS for NB-IOT",3GPP TSG RAN WG1 #84 meeting R1-161234,St. Julian, Malta, Feb. 15-19, 2016, total 3 pages.
Lenovo et al.,"Discussion on resource partitioning for IAB network",3GPP TSG RAN WG1 Meeting #94 R1-1808551, Gothenburg, Sweden, Aug. 20-24, 2018,total 3 pages.
ATandT,"Enhancements to support NR backhaul links",3GPP TSG RAN WG1 Meeting #94 R1-1809072,Gothenburg, Sweden, Aug. 20-24, 2018, total 10 pages.
ATandT et al., "New SID Proposal: Study on Integrated Access and Backhaul for NR", 3GPP TSG RAN Meeting #78 RP-172290, Lisbon, Portugal, Dec. 18-21, 2017, total 5 pages.
PCT/ISA/220 Search Report for PCT/CN2019/108341 dated Sep. 27, 2019, 8 pages.
Extended European Search Report issued in EP1986647.3, dated Sep. 23, 2021, 11 pages.

SLOT FORMAT CONFIGURATION METHOD AND COMMUNICATIONS APPARATUS

CROSS-REFERENCE TO RELATED APPLICATIONS

This application is a continuation of International Application No. PCT/CN2019/108341, filed on Sep. 27, 2019, which claims priority to Chinese Patent Application No. 201811138766.0, filed on Sep. 28, 2018. The disclosures of the aforementioned applications are hereby incorporated by reference in their entireties.

TECHNICAL FIELD

This application relates to the communications field, and more specifically, to a slot format configuration method and a communications apparatus.

BACKGROUND

In a relay network, a relay node (RN) communicates with a parent node by using a parent backhaul link, and communicates with a child terminal device by using an access link or communicates with a child relay node by using a child backhaul link. In-band relay is a relay solution in which a parent backhaul link and an access link or a parent backhaul link and a child backhaul link share a same frequency band. The in-band relay is usually subject to a half-duplex constraint. Specifically, when receiving a downlink signal sent by the parent node of the relay node, the relay node cannot send a downlink signal to any child node(s) (including the child terminal device and the child relay node) of the relay node; and when receiving an uplink signal sent by the child node of the relay node, the relay node cannot send an uplink signal to the parent node of the relay node.

A new radio (NR) in-band relay solution is referred to as integrated access and backhaul (IAB), and a relay node is referred to as an IAB node. Functions of the IAB node may be divided into two parts: a user equipment (UE) function and a base station function. The UE function is responsible for communication between the IAB node and a parent node, and the base station function is responsible for communication between the IAB node and a child node. If the base station function of the IAB node needs to ensure normal communication with the child node, a slot format for communication between the base station function of the IAB node and the child node needs to be configured. However, the existing technology does not provide a solution to how to configure a slot format for communication between a base station function of an IAB node and a child node.

SUMMARY

Embodiments of this application provide a slot format configuration method. Based on the method, a slot format used for communication between an IAB node and a child node can be configured, thereby laying the foundation for normal communication between the IAB node and the child node.

According to a first aspect of an embodiment, a slot format configuration method is provided. The method includes: A first node receives first configuration information sent by a second node, where the second node is a parent node of the first node;

the first node determines a slot format of each slot in a first set of slots based on the first configuration information, where the first set includes slots that are used for communication between the first node and a third node in one or more periods, the third node is a child IAB node of the first node or a terminal device served by the first node, the slot format indicates a type of each symbol in a slot, and the type of the symbol includes at least an uplink symbol and a downlink symbol; and the first node modifies slot formats of a subset of slots of the first set to obtain modified slot formats of the subset of slots.

According to the slot format configuration method provided in an embodiment of this application, the first node first configures the slot format of each slot used for communication between the first node and the child node, and then the first node modifies some of the configured slot formats, so that the first node can determine an actual slot format of each slot used for communication between the first node and the child node. In this way, the first node can communicate with the child node based on the actual slot format of each slot used for communication with the child node.

In embodiments of this application, the second node may be an IAB node or a donor node.

When the second node is an IAB node, the second node may first determine the first configuration information, and then directly send the first configuration information to the first node without using another node. Alternatively, the second node may first determine the first configuration information, and then send the first configuration information to a donor node, and then the donor node directly sends the first configuration information to the first node. Alternatively, the second node may first send the first configuration information to the donor node, then the donor node sends the first configuration information to the second node, and finally the second node sends the first configuration information to the first node. When the second node is a donor node, the second node may directly send the first configuration information to the first node.

Optionally, the first configuration information may be at least one index value, the at least one index value is in a one-to-one correspondence with at least one slot included in the first set, and each index value is used to indicate a slot format of a slot corresponding to the index value.

Optionally, the first configuration information may be semi-static signaling. For example, the first configuration information may be a radio resource control (RRC) message (or RRC signaling), or the first configuration information may be transferred by using an interface between the second node and a base station function of the first node or an interface between the donor node and a base station function of the first node, for example, an F1 application protocol (F1-AP) interface. F1 is an interface between a central unit (CU) and a distributed unit (DU).

In an embodiment of this application, the uplink symbol is a symbol used for uplink communication, and on the uplink symbol, the third node may perform uplink communication. The downlink symbol is a symbol used for downlink communication, and on the downlink symbol, the first node may perform downlink communication.

Optionally, the type of the symbol may further include a symbol whose transmission direction is to be determined and/or a symbol that is not used by the first node to communicate with the third node. In this specification, the symbol whose transmission direction is to be determined is referred to as a flexible symbol, and the symbol that is not used by the first node to communicate with the third node is referred to as a silent symbol.

Optionally, the subset of slots may be several specific slots, for example, may be several slots specified in a protocol or several slots indicated by the second node.

Optionally, the subset of slots may include a flexible slot configured by using the first configuration information.

In an understanding, if all symbols in one slot are flexible symbols, the slot may be referred to as a flexible slot. In another understanding, as long as one slot includes a flexible symbol, the slot is referred to as a flexible slot. For example, if one slot includes 14 symbols, as long as there is one flexible symbol among the 14 symbols, the slot may be referred to as a flexible slot, regardless of a type of any other symbol.

The flexible slot configured by using the first configuration information may be modified to an uplink slot, a downlink slot, a silent slot, or a flexible slot; or some flexible symbols in the flexible slot configured by using the first configuration information may be modified to uplink symbols, downlink symbols, silent symbols, or flexible symbols. In a possible implementation, the first node may autonomously determine transmission directions of slots that are still flexible slots after the first node modifies the slot formats. In another possible implementation, slots that are still flexible slots after the first node modifies the slot formats may be used as silent slots.

In the foregoing embodiments, the uplink slot is a slot in which all symbols are uplink symbols. The downlink slot is a slot in which all symbols are downlink symbols. In an embodiment, if all symbols in one slot are silent symbols, the slot may be referred to as a silent slot. In another embodiment, as long as there is one silent symbol included in one slot, the slot is referred to as a silent slot.

Optionally, the flexible/silent slots configured by using the first configuration information are backhaul slots between the second node and the first node, that is, slots used for communication between the second node and the first node.

With reference to the first aspect, in some implementations of the first aspect, before the first node modifies the slot formats of the subset of slots of the first set, the method further includes:

The first node receives second configuration information sent by the second node, where the second configuration information is used to reconfigure the slot formats of the subset of slots; and that the first node modifies slot formats of a subset of slots of the first set includes:

the first node modifies the slot formats of the subset of slots based on the second configuration information.

It may be understood that, similar to a sending manner of the first configuration information, the second configuration information may be independently determined by the second node and then sent to the first node; or may be independently determined by the second node before being sent to the donor node, then sent by the donor node to the second node, and then sent by the second node to the first node. Alternatively, the second configuration information may be independently determined by the donor node, and then sent to the first node by using the second node.

Optionally, the flexible slot configured by using the first configuration information may be modified, by using the second configuration information, to an uplink slot, a downlink slot, a silent slot, or a flexible slot; or some flexible symbols in the flexible slot configured by using the first configuration information may be modified to uplink symbols, downlink symbols, silent symbols, or flexible symbols.

Optionally, in the flexible slot configured by using the second configuration information or on the flexible symbol configured by using the second configuration information, the first node does not communicate with the third node. In other words, the flexible slot/symbol configured by using the second configuration information is equivalent to a silent slot.

Optionally, the second configuration information may be dynamic signaling, and the dynamic signaling may be, for example, downlink control information (DCI), a media access control unit (MAC CE), or other dynamic signaling. Further, the DCI may be a DCI format 2-0 or another DCI format.

The second configuration information is sent by using dynamic signaling, so that the first node can modify the slot formats of the subset of slots in a timely manner.

Optionally, the slot formats that are of the subset of slots and that are indicated by the second configuration information may be cross-cycle, so that the first node can modify the slot formats of the subset of slots in a timely manner.

With reference to the first aspect, in some implementations of the first aspect, the method further includes:

The first node sends a requirement report message to the second node, where the requirement report message is used to indicate an uplink-downlink configuration that the first node expects to use to perform communication with the third node.

Specifically, before the second node sends the second configuration information, the first node may send the requirement report message to the second node. In this way, the second node may determine the second configuration information based on the uplink-downlink configuration that the first node expects to communicate with the third node, so that the slot formats of the subset of slots meet a requirement of the second node.

With reference to the first aspect, in some implementations of the first aspect, the first node may autonomously modify the slot formats of the subset of slots.

With reference to the first aspect, in some implementations of the first aspect, the method further includes:

The first node sends first indication information to the second node, where the first indication information is used to indicate the modified slot formats of the subset of slots.

For example, after autonomously modifying the slot formats of the subset of slots, the first node may send the first indication information to the second node, so that the second node learns of the modified slot formats of the subset of slots. In this way, when communicating with the first node or another node, the second node can avoid or reduce interference as much as possible by referring to the modified slot formats for communication between the first node and the third node.

With reference to the first aspect, in some implementations of the first aspect, the method further includes:

The first node sends third configuration information to the third node, where the third configuration information is used to configure a slot format of the third node.

With reference to the first aspect, in some implementations of the first aspect, the method further includes:

The first node communicates with the third node based on the slot format of the third node and the modified slot formats for communication between the first node and the third node.

Further, the first node may trigger or prohibit spatial multiplexing based on the slot format of the third node and the modified slot formats for communication between the first node and the third node.

According to a second aspect of an embodiment, a slot format configuration method is provided. The method includes:

A second node determines a slot format of each slot in a first set of slots, where the first set includes slots that are used for communication between a first node and a third node in one or more periods, the third node is a child integrated access and backhaul (IAB) node of the first node or a terminal device served by the first node, the slot format indicates a type of each symbol in a slot, and the type of the symbol includes at least an uplink symbol and a downlink symbol; and the second node sends first configuration information to the first node, where the first configuration information is used to indicate the slot format of each slot in the first set.

According to the slot format configuration method provided in embodiments of this application, the second node may configure, by using the first configuration information, the slot format of each slot used for communication between the first node and the child node, thereby laying the foundation for normal communication between the IAB node and the child node.

With reference to the second aspect, in some implementations of the second aspect, the method further includes:

The second node sends second configuration information to the first node, where the second configuration information is used to modify slot formats of a subset of slots in the first set.

With reference to the second aspect, in some implementations of the second aspect, before the second node sends the second configuration information to the first node, the method further includes:

The second node receives a requirement report message sent by the first node, where the requirement report message is used to indicate an uplink-downlink configuration that the first node expects to use to perform communication with the third node.

With reference to the second aspect, in some implementations of the second aspect, the method further includes:

The second node receives first indication information sent by the first node, where the first indication information is used to indicate modified slot formats of the subset of slots in the first set.

With reference to the second aspect, in some implementations of the second aspect, the type of the symbol further includes a flexible symbol and/or a silent symbol, the flexible symbol configured by using the first configuration information refers to a symbol whose transmission direction is not determined, and the first node does not communicate with the third node on the silent symbol.

With reference to the second aspect, in some implementations of the second aspect, the subset of slots are slots in which flexible symbols configured by using the first configuration information are located, and the flexible symbols configured by using the first configuration information refer to symbols whose transmission directions are not determined.

For any one of the foregoing implementations of the second aspect, refer to the descriptions of the corresponding implementation of the first aspect. Details are not described herein again.

According to a third aspect of an embodiment, a communications apparatus is provided. The communications apparatus includes units configured to perform the steps of the method according to any one of the implementations of the first aspect and the second aspect.

In an implementation, the communications apparatus is a communications chip. The communications chip may include an input circuit or interface configured to send information or data, and an output circuit or interface configured to receive information or data.

In another implementation, the communications apparatus is a communications device (for example, an IAB node). The communications device may include a transmitter configured to send information or data, and a receiver configured to receive information or data.

According to a fourth aspect of an embodiment, a communications apparatus is provided. The communications apparatus includes units configured to perform the steps of the method according to any one of the second aspect or the implementations of the second aspect.

In an implementation, the communications apparatus is a communications chip. The communications chip may include an input circuit or interface configured to send information or data, and an output circuit or interface configured to receive information or data.

In another implementation, the communications apparatus is a communications device (for example, an IAB node or a donor node (for example, a base station)). The communications device may include a transmitter configured to send information or data, and a receiver configured to receive information or data.

According to a fifth aspect of an embodiment, a network device is provided. The network device includes a transceiver, a processor, and a memory. The processor is configured to control the transceiver to receive or send a signal, the memory is configured to store a computer program, and the processor is configured to invoke the computer program from the memory and run the computer program, to enable the terminal device to perform the method according to any one of the first aspect or the possible implementations of the first aspect, or the method according to any one of the second aspect or the possible implementations of the second aspect.

Optionally, there are one or more processors and one or more memories.

Optionally, the memory may be integrated into the processor, or the memory and the processor are separately disposed.

In an example implementation process, the processor may be configured to perform, for example, but not limited to, baseband-related processing, and the receiver and the transmitter may be respectively configured to perform, for example, but not limited to, radio frequency receiving and sending. The foregoing components may be separately disposed on chips that are independent of each other, or at least some or all of the foregoing components may be disposed on a same chip. For example, the receiver and the transmitter may be disposed on a receiver chip and a transmitter chip that are independent of each other, or may be integrated as a transceiver and then disposed on a transceiver chip. For another example, the processor may be further classified into an analog baseband processor and a digital baseband processor, where the analog baseband processor and the transceiver may be integrated into a same chip, and the digital baseband processor may be disposed on an independent chip. With continuous development of integrated circuit technologies, an increasing quantity of components can be integrated into a same chip. For example, the digital baseband processor and a plurality of application processors (for example, but not limited to a graphics processor and a multimedia processor) may be integrated into a same chip. Such a chip may be referred to as a system on chip. Whether the components are independently disposed on different chips or are integrated and disposed on one or more chips usually depends on specific requirements of a product design. A specific implementation form of the foregoing components is not limited in the embodiments of this application.

According to a sixth aspect of an embodiment, a processor is provided. The processor includes an input circuit, an output circuit, and a processing circuit. The processor is configured to: receive a signal by using the input circuit, and transmit a signal by using the output circuit, so that the processor performs the method according to any one of the first aspect and the second aspect or the possible implementations of the first aspect and the second aspect.

In an example implementation process, the processor may be a chip, the input circuit may be an input pin, the output circuit may be an output pin, and the processing circuit may be a transistor, a gate circuit, a trigger, various logic circuits, or the like. The input signal received by the input circuit may be received and input by, for example, but not limited to, a receiver, the signal output by the output circuit may be output to, for example, but not limited to, a transmitter and transmitted by the transmitter, and the input circuit and the output circuit may be a same circuit, where the circuit is used as the input circuit and the output circuit at different moments. Specific implementations of the processor and the various circuits are not limited in the embodiments of this application.

According to a seventh aspect of an embodiment, a processing apparatus is provided. The processing apparatus includes a memory and a processor. The processor is configured to: read instructions stored in the memory, receive a signal by using a receiver, and transmit a signal by using a transmitter, to perform the method according to any one of the first aspect and the second aspect or the possible implementations of the first aspect and the second aspect.

Optionally, there are one or more processors and one or more memories.

Optionally, the memory may be integrated into the processor, or the memory and the processor are separately disposed.

In an example implementation process, the memory may be a non-transitory memory, for example, a read-only memory (ROM). The memory and the processor may be integrated into a same chip, or may be separately disposed on different chips. A type of the memory and a manner of disposing the memory and the processor are not limited in the embodiments of this application.

According to an eighth aspect of an embodiment, a chip is provided. The chip includes a processor and a memory. The memory is configured to store a computer program. The processor is configured to invoke the computer program from the memory and run the computer program. The computer program is used to implement the method according to any one of the first aspect and the second aspect or the possible implementations of the first aspect and the second aspect.

According to a ninth aspect of an embodiment, a computer program product is provided. The computer program product includes a computer program (which is also referred to as code or one or more instructions), and when the computer program is run, a computer is enabled to perform the method according to any one of the first aspect and the second aspect or the possible implementations of the first aspect and the second aspect.

According to a tenth aspect of an embodiment, a computer-readable medium is provided. The computer-readable medium stores a computer program (which is also referred to as code or one or more instructions), and when the computer program is run on a computer, the computer is enabled to perform the method according to any one of the first aspect and the second aspect or the possible implementations of the first aspect and the second aspect.

DESCRIPTION OF EMBODIMENTS

The following describes the technical solutions of this application with reference to the accompanying drawings.

The technical solutions in the embodiments of this application may be used in a 5th generation (5G) system, a new radio (NR) system, a future communications system, or the like.

In an implementation, the technical solutions in the embodiments of this application may be used in an in-band relay system (namely, an IAB system). The IAB system may include a donor node, several IAB nodes, and several terminal devices. The IAB node is connected to a parent node by using a radio link, and the IAB node may provide a service for a child node of the IAB node. The parent node may be a base station (for example, a gNB in NR), or may be another IAB node. The child node may be a common terminal device, or may be another IAB node. The donor node may be a base station (for example, a gNodeB) or a relay transmission reception point (rTRP). When the donor node is a gNodeB, the donor node may be simply represented as DgNB.

A link for communication between the IAB node and the parent node is referred to as a parent backhaul (parent BH) link, a link for communication between the IAB node and the child terminal device is referred to as an access (AC) link, and a link for communication between the IAB node and the child IAB node is referred to as a child backhaul (child BH) link. Sometimes, the link for communication between the IAB node and the parent node is referred to as a backhaul link, and the link for communication between the IAB node and the child node is referred to as an access link (regardless of whether the child node is a terminal device or an IAB node). For ease of understanding, in embodiments of this application, the link for communication between the IAB node and the parent node is uniformly referred to as the parent backhaul link, the link for communication between the IAB node and the child terminal device is uniformly referred to as the access link, and the link for communication between the IAB node and the child IAB node is uniformly referred to as the child backhaul link.

Figure 1:
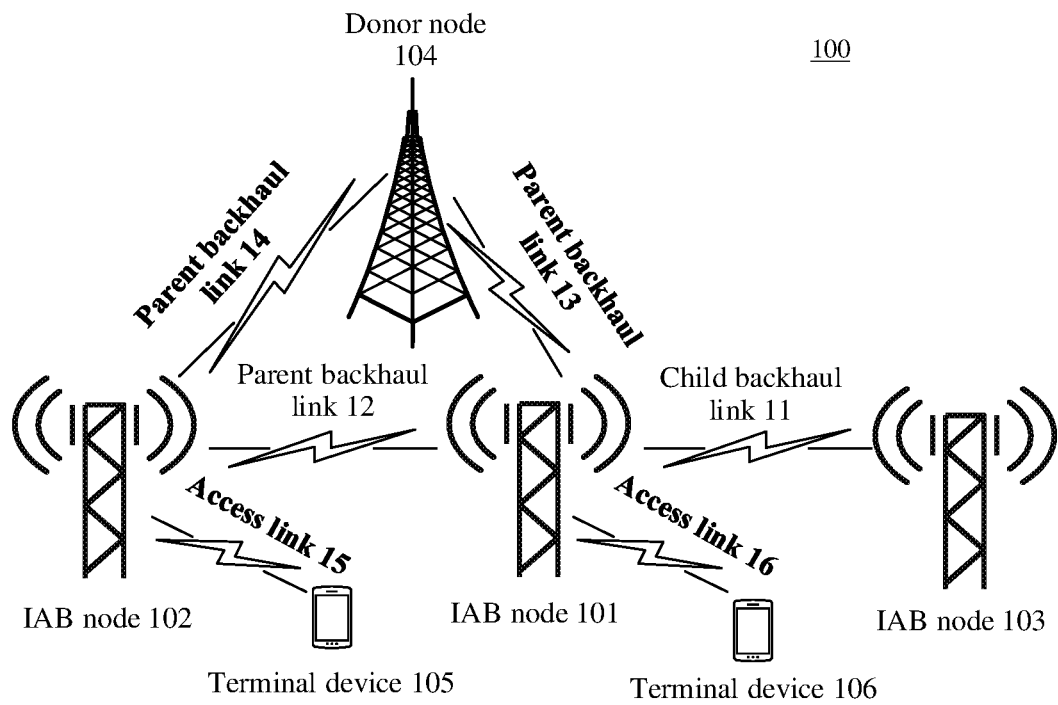
FIG. 1 is a schematic diagram of an IAB system applicable to embodiments of this application.

FIG. 1 is a schematic diagram of an IAB system 100 according to an embodiment. As shown in FIG. 1, the system 100 includes an IAB node 101, an IAB node 102, an IAB node 103, a donor node 104, a terminal device 105, and a terminal device 106.

As shown in FIG. 1, the IAB node 103 and the terminal device 106 are child nodes (or referred to as subnodes or downstream nodes) of the IAB node 101. The IAB node 101 communicates with the IAB node 103 by using a child backhaul link 11, and the IAB node 101 provides a service for the terminal device 106 by using an access link 16. The IAB node 102 provides a service for the terminal device 105 by using an access link 15. In a network topology, a parent node (or referred to as an upstream node) of the IAB node 101 is the donor node 104, and the IAB node 101 may directly communicate with the donor node 104 by using a parent backhaul link 13, without using another IAB node. In another network topology, the parent node of the IAB node 101 is the IAB node 102, and the IAB node 101 may communicate with the donor node 104 by using an intermediate IAB node. As shown in FIG. 1, the IAB node 101 may first communicate with the IAB node 102, and then communicate with the donor node 104 via the IAB node 102. The IAB node 101 communicates with the IAB node 102 by using a parent backhaul link 12, and the IAB node 102 communicates with the donor node 104 by using a parent backhaul link 14. In some descriptions, when a child node of an IAB node is an IAB node, the child node may be referred to as a child IAB node (or a downstream IAB node) of the IAB node. Correspondingly, the IAB node may be referred to as a parent IAB node (or an upstream IAB node) of the child node. For example, the IAB node 103 may be referred to as a child IAB node of the IAB node 101.

In present disclosure, a terminal device, for example, the terminal device 105 or the terminal device 106, may also be referred to as UE, a mobile station, an access terminal, a subscriber unit, a subscriber station, a mobile station, a remote station, a remote terminal, a mobile device, a terminal, a wireless communications device, a user agent, a user apparatus, or the like. The terminal device may be specifically any one of a station (ST) in a WLAN, a cellular phone, a cordless phone, a session initiation protocol (SIP) phone, a wireless local loop (WLL) station, a personal digital assistant (PDA), a handheld device with a wireless communication function, a computing device, another processing device connected to a wireless modem, an in-vehicle device, a wearable device, a mobile station in a future 5G network, a terminal device in a future evolved PLMN network, or the like.

Figure 2:
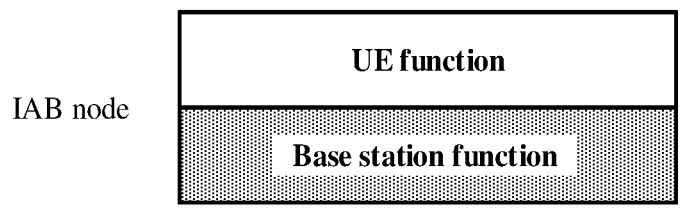
FIG. 2 is a schematic diagram of a UE function and a base station function of an IAB node according to an embodiment.

As shown in FIG. 2, functions of an IAB node (for example, the IAB node 101) may be divided into two parts: a UE function and a base station function. The UE function is responsible for communication between the IAB node and a parent node, and the base station function is responsible for communication between the IAB node and a child node. Specifically, a function of the IAB node for a parent node is different from a function of the IAB node for a child node. In a possible implementation, a part/function of the IAB node for accessing a parent node by using a parent backhaul link may be referred to as a mobile terminal (MT), and the part may perform a function similar to that of UE in NR. A part/function of the IAB node for providing access for a child node by using an access link may be referred to as a distributed unit (DU), and the part may perform a function similar to that of a base station in NR.

It may be understood that, if the IAB node (or the base station function of the IAB node) needs to perform normal communication with a child node, a slot format or a transmission direction for communication between the IAB node and the child node needs to be configured, that is, a slot format of the base station function of the IAB node needs to be configured. However, a solution of configuring a slot format for communication between an IAB node and a child node is not provided yet in the existing technology.

Therefore, embodiments of this application provide a slot format configuration method. Based on the method, a slot format used for communication between an IAB node and a child node can be configured, thereby laying the foundation for normal communication between the IAB node and the child node. The following describes in detail the slot format configuration method provided in embodiments of this application.

It should be understood that, in the following specific descriptions of the method provided in embodiments of this application, for ease of understanding, some steps are described by using a first node as an execution body. However, these steps may alternatively be implemented by a component (for example, a chip or a circuit) of the first node in actual practice. Similarly, some other steps are described by using a second node, a third node, or a terminal device as an execution body. Correspondingly, these steps may alternatively be implemented by a component (for example, a chip or a circuit) of the second node, a component (for example, a chip or a circuit) of the third node, or a component (for example, a chip or a circuit) of the terminal device in actual practice.

Figure 3:
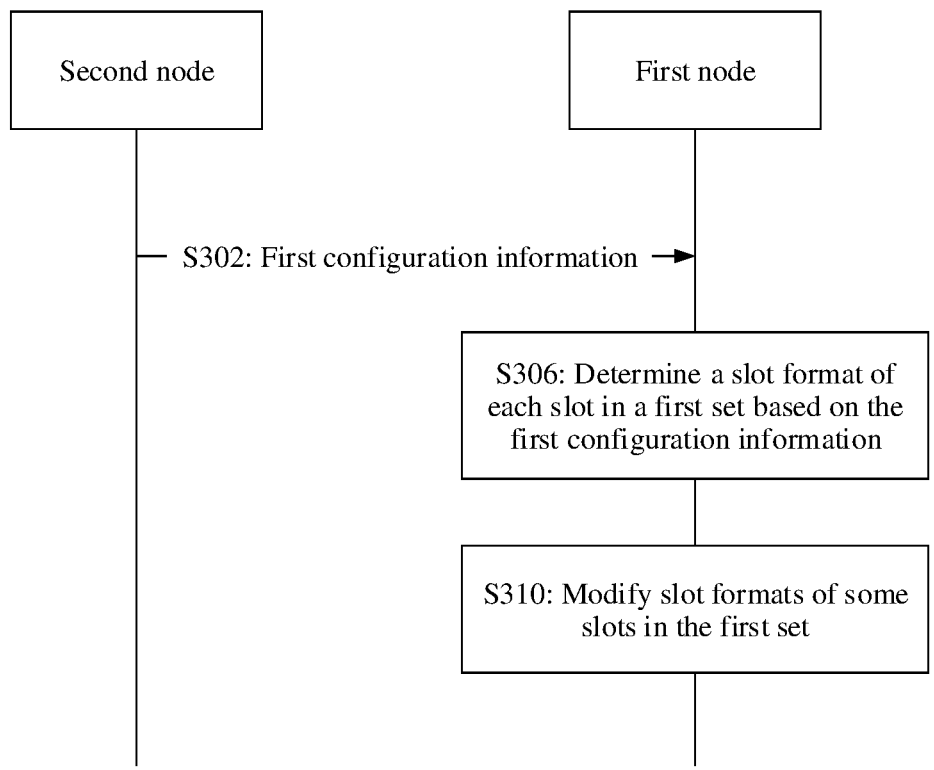
FIG. 3 is a schematic flowchart of a slot format configuration method according to an embodiment.

FIG. 3 shows a slot format configuration method according to an embodiment of this application. The following provides a detailed description with reference to each step.

S302: A second node sends first configuration information to a first node. Correspondingly, the first node receives the first configuration information sent by the second node. The first configuration information is used to configure a slot format of each slot used for communication between the first node and a third node in one or more periods.

The first node is a child node of the second node; in other words, the second node is a parent node of the first node. The third node is a child node of the first node; in other words, the first node is a parent node of the third node. The first node may be an IAB node. The third node may be an IAB node or a terminal device. In other words, the third node may be a child IAB node of the first node or a terminal device served by the first node. The second node may be an IAB node or a donor node. With reference to FIG. 1, the first node is the IAB node 101 in the figure, the second node is the IAB node 102 or the donor node 104 in the figure, and the third node is the IAB node 103 or the terminal device 106 in the figure.

When the second node is an IAB node, the second node may first determine the first configuration information, and then directly send the first configuration information to the first node without using another node. Alternatively, the second node may first determine the first configuration information, and then send the first configuration information to a donor node, and then the donor node directly sends the first configuration information to the first node. Alternatively, the second node may first send the first configuration information to the donor node, then the donor node sends the first configuration information to the second node, and finally the second node sends the first configuration information to the first node. When the second node is a donor node, the second node may directly send the first configuration information to the first node.

The first configuration information may be semi-static signaling. For example, the first configuration information may be an RRC message (or RRC signaling), or the first configuration information may be transferred by using an interface between the second node and a base station function of the first node or an interface between the donor node and a base station function of the first node, for example, an F1-AP interface. The signaling or the interface that carries the first configuration information is not limited in embodiments of this application.

The first configuration information may be used to configure the slot format used for communication between the first node and the third node. In other words, the first configuration information may be used to configure a slot format of the base station function of the first node or a slot format of a base station function link of the first node. Specifically, the first configuration information may be used to configure the slot format of each slot used for communication between the first node and the third node in one or more periods. Each of the plurality of periods may be a multi-cycle period (for example, a dual-cycle period), and the multi-cycle period may be understood as a long period including a plurality of single-cycle periods. For example, refer to FIG. 4, a length of a first period is P1, a length of a second period is P2, and a period combining the first period and the second period is a dual-cycle period. P1 may be equal or may not be equal to P2, and a slot format in the first period may be the same as or different from a slot format in the second period. This is not limited in embodiments of this application. A single period may be understood as one period according to the ordinary meaning of it. A length of a single-cycle period or a multi-cycle period may be configured by the second node or the donor node.

In a possible implementation, the first configuration information may alternatively be specific to a plurality of single-cycle periods or a plurality of multi-cycle periods. Herein, it means that the first configuration information may explicitly indicate a slot format of each slot in a plurality of single-cycle periods or a plurality of multi-cycle periods (for example, a plurality of dual-cycle periods). Alternatively, although only a slot format of each slot in one single-cycle period or one multi-cycle period is configured by using the first configuration information, before the first node receives other semi-static signaling used to configure the slot format of each slot used for communication between the first node and the third node, it is considered that the slot format of each slot used for communication between the first node and the third node complies with the slot format configured by using the first configuration information.

In this specification, for ease of understanding and description, a set including slots that are used for communication between the first node and the third node in one or more periods is referred to as a first set of slots. It is easy to understand that the first configuration information is used to configure slot formats of the first set, or the first configuration information is used to configure the slot format of each slot in the first set.

A slot format indicates a type of each symbol in a slot, and the type of the symbol includes at least an uplink symbol and a downlink symbol. It is easy to understand that the uplink symbol is a symbol used for uplink communication, and on the uplink symbol, the third node may perform uplink communication. The downlink symbol is a symbol used for downlink communication, and on the downlink symbol, the first node may perform downlink communication.

The type of the symbol may further include a symbol whose transmission direction is to be determined and/or a symbol that is not used by the first node to communicate with the third node. In this specification, for ease of understanding and description, the symbol whose transmission direction is to be determined is referred to as a flexible symbol, and the symbol that is not used by the first node to communicate with the third node is referred to as a silent symbol. A person skilled in the art may understand that the symbol whose transmission direction is to be determined may also have another name. A name of the symbol whose transmission direction is to be determined is not limited in embodiments of this application. Similarly, the symbol that is not used by the first node to communicate with the third node may also have another name, for example, a reserved symbol. A name of the symbol that is not used by the first node to communicate with the third node is not limited in embodiments of this application.

In addition, to make a person skilled in the art better understand this specification, the following definitions are provided in this specification:
(1) Uplink slot: a slot in which all symbols are uplink symbols.
(2) Downlink slot: a slot in which all symbols are downlink symbols.
(3) Flexible slot: In an embodiment, if all symbols in one slot are flexible symbols, the slot may be referred to as a flexible slot. In another embodiment, as long as one slot includes a flexible symbol, the slot is referred to as a flexible slot. For example, if one slot includes 14 symbols, as long as there is one flexible symbol among the 14 symbols, the slot may be referred to as a flexible slot, regardless of a type of any other symbol.
(4) Silent slot: In an embodiment, if all symbols in one slot are silent symbols, the slot may be referred to as a silent slot. In another embodiment, as long as there is a silent symbol included in one slot, the slot is referred to as a silent slot.

In the accompanying drawings and the embodiments provided in this specification, "U" is used to represent an uplink symbol/slot, "D" is used to represent a downlink symbol/slot, and "F" is used to represent a flexible symbol/slot.

Figure 4:
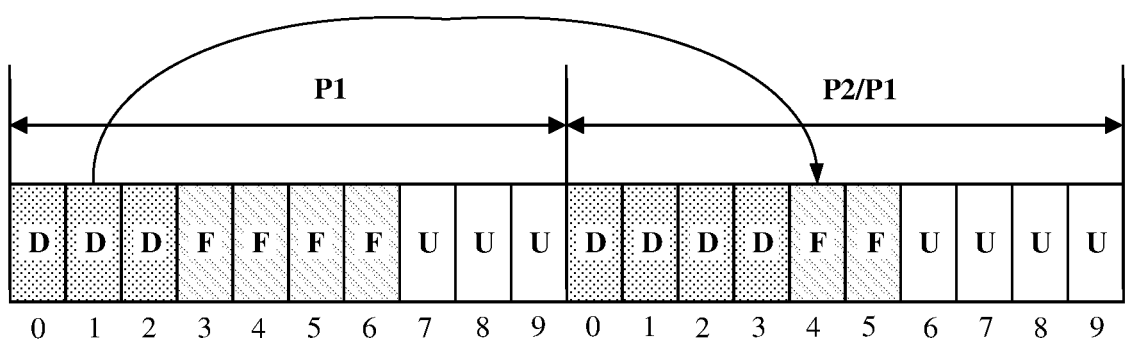
FIG. 4 is a schematic diagram of a slot format configuration according to an embodiment.

Referring to a non-limiting, example slot format configuration shown in FIG. 4, slot 0 to slot 9 in the first period are configured, by using the first configuration information, as downlink slots (the slot 0 to the slot 2), flexible slots (the slot 3 to the slot 6), and uplink slots (the slot 7 to the slot 9). Slot 0 to slot 9 in the second period are configured, by using the first configuration information, as downlink slots (the slot 0 to the slot 3), flexible slots (the slot 4 to the slot 5), and uplink slots (the slot 6 to the slot 9).

In embodiments of this application, a transmission direction of the symbol whose transmission direction is to be determined may be configured by using dynamic signaling (for example, second configuration information described below), or may be autonomously configured by the first node.

Further, the two configuration manners may be distinguished by assigning different names or identifiers to symbols whose transmission directions are to be determined. For example, in one configuration manner, the symbol whose transmission direction is to be determined may also be referred to as a reserved symbol, or denoted as "E". In the other configuration manner, the symbol whose transmission direction is to be determined may be referred to as a to-be-determined symbol, or denoted as "S". Alternatively, the foregoing two configuration manners may be distinguished from a perspective of slot format. For example, when a slot format is "1" or "2", it indicates that all symbols in the slot are flexible symbols. Furthermore, when the slot format is "1", it indicates that transmission directions of the flexible symbols are configured by using dynamic signaling; and when the slot format is "2", it indicates that transmission directions of the flexible symbols are autonomously configured by the first node.

In a possible implementation, the flexible/silent slots configured by using the first configuration information are backhaul slots between the second node and the first node, that is, slots used for communication between the second node and the first node.

S306: The first node determines the slot format of each slot in the first set based on the first configuration information.

That the first node determines the slot format of each slot in the first set based on the first configuration information may be understood as a process in which the first node decodes the first configuration information. For details about a manner of decoding the first configuration information, refer to a decoding manner in the conventional technology. Details are not described herein. After decoding the first configuration information, the first node may learn of the slot format of each slot in the first set.

S310: The first node modifies slot formats of a subset of slots of the first set to obtain modified slot formats of the subset of slots.

In S310, the first node may modify a slot format of a flexible slot configured by using the first configuration information. In addition, the first node may further modify other slot formats configured by using the first configuration information. In addition, that the first node needs to modify the slot format of the flexible slot is not limited in embodiments of this application.

For example, the first node may modify the flexible slot to an uplink slot, a downlink slot, a silent slot, or a flexible slot; or the first node may modify some flexible symbols in the flexible slot to an uplink symbol, a downlink symbol, a silent symbol, or a flexible symbol. In a possible implementation, the first node may autonomously determine transmission directions of slots that are still flexible slots after the first node modifies the slot formats. In another possible implementation, slots that are still flexible slots after the first node modifies the slot formats may be used as silent slots.

Optionally, the subset of slots may be several specific slots, for example, may be several slots specified in a protocol or several slots indicated by the second node.

In conclusion, according to the method in this embodiment of this application, the first node first configures the slot format of each slot used for communication between the first node and the child node, and then the first node modifies some configured slot formats, so that the first node can determine an actual slot format of each slot used for communication between the first node and the child node. In this way, the first node can communicate with the child node based on the actual slot format of each slot used for communication with the child node.

It should be noted that, for ease of understanding and description, in this specification, the slot format that is of each slot in the first set and that is obtained before the slot formats of the subset of slots are modified is referred to as an initial slot format of the base station function of the first node; and the slot format that is of each slot in the first set and that is obtained after the slot formats of the subset of slots are modified is referred to as an actual slot format of the base station function of the first node.

S310 may be specifically implemented in two optional manners. Manner 1: The first node may modify the slot formats of the subset of slots based on an indication of the second node. Manner 2: The first node independently or autonomously modifies the slot formats of the subset of slots. The following describes the two manners in detail with reference to FIG. 5 and FIG. 6.

Figure 5:
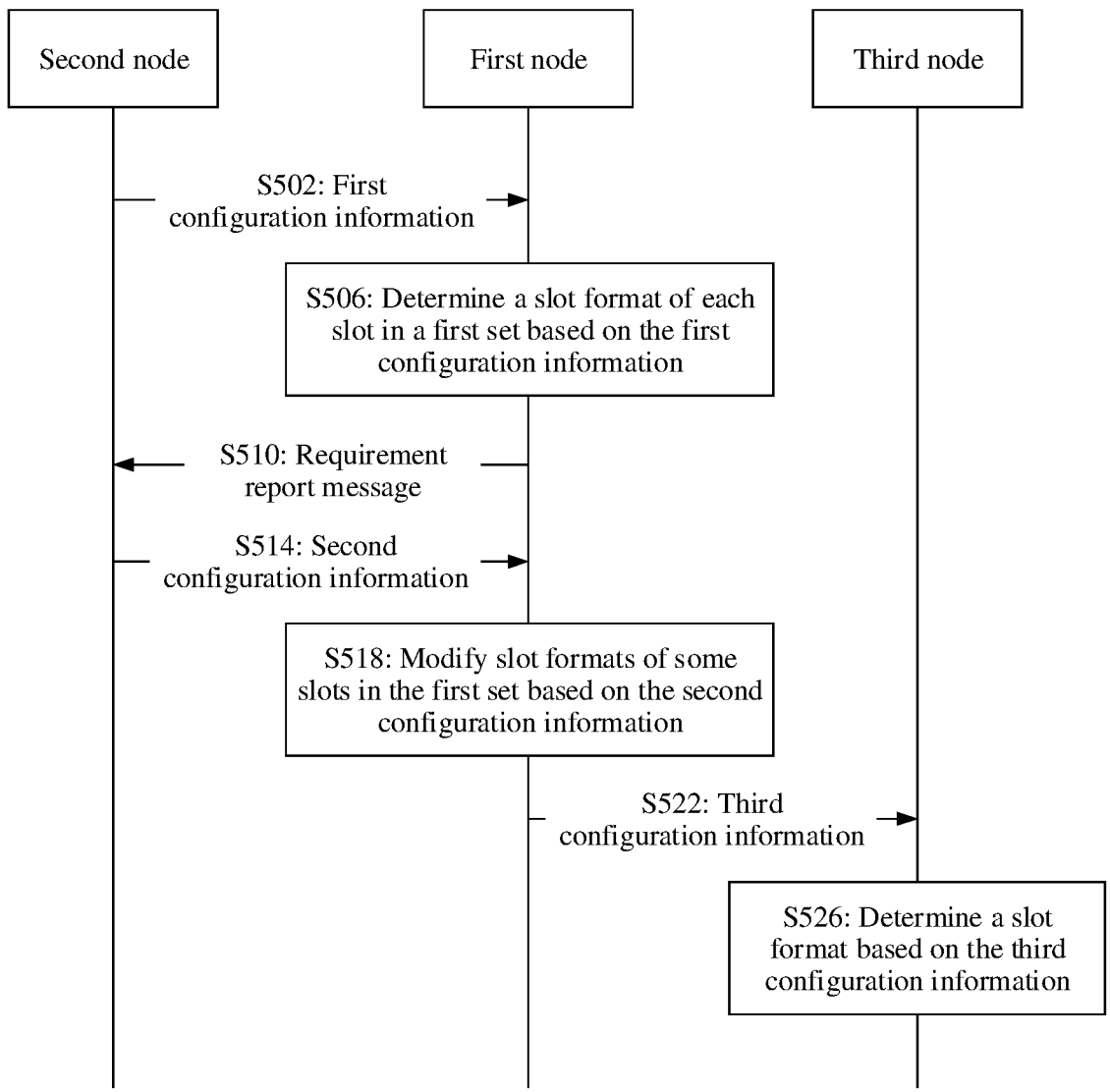
FIG. 5 is a schematic flowchart of an example slot format configuration method according to an embodiment of this application.

FIG. 5 shows a slot format configuration method according to an embodiment. In this method, the first node may modify the slot formats of the subset of slots based on the second configuration information sent by the second node. The following provides a detailed description with reference to the accompanying drawing.

S502 to S506: The second node sends the first configuration information to the first node, and the first node determines the slot format of each slot in the first set based on the first configuration information. For details, refer to the foregoing descriptions of step S302 and step S306 in the method shown in FIG. 3. Details are not described herein again.

S510: The first node sends a requirement report message to the second node. Correspondingly, the second node receives the requirement report message sent by the first node.

The requirement report message is used to indicate an uplink-downlink configuration that the first node expects to use to perform communication with the third node. For example, the requirement report message may be specifically used to indicate that the first node requests to add an uplink slot or add a downlink slot. The requirement report message may be reported by using dynamic signaling such as uplink control information (UCI), or may be reported by using RRC signaling or F1 interface information.

S514: The second node sends the second configuration information to the first node. Correspondingly, the first node receives the second configuration information sent by the second node.

S518: The first node modifies the slot formats of the subset of slots of the first set based on the second configuration information.

It should be understood that, that the first node modifies the slot formats of the subset of slots may be understood as that the first node decodes the second configuration information.

In the foregoing description, step S510 is an optional step. If S510 is performed, the second node needs to consider the requirement report message when generating the second configuration information. In other words, the second configuration information may be generated based on the requirement report message. If S510 is not performed, the second node does not need to consider the requirement report message when generating the second configuration information.

Similar to a sending manner of the first configuration information, the second configuration information may be independently determined by the second node and then sent to the first node; or may be independently determined by the second node before being sent to the donor node, then sent by the donor node to the second node, and then sent by the second node to the first node. Alternatively, the second configuration information may be independently determined by the donor node, and then sent to the first node by using the second node. If the second configuration information is independently determined by the donor node, the second node needs to send the requirement report message to the donor node.

The second configuration information is used to indicate the slot format of each of the subset of slots. Using the second configuration information to indicate the slot format of each of the subset of slots may be: (1) the second configuration information directly indicates the slot format of each of the subset of slots, or alternatively, (2) the second configuration information directly indicates a slot format used for communication between the second node and the first node, and the first node is indicated to follow the slot format, for example, it may be specified in a protocol or indicated by signaling that the slot format used for communication between the first node and the third node needs to be the same as the slot format used for communication between the second node and the child node of the second node.

In a possible implementation, in the flexible slot configured by using the second configuration information or on the flexible symbol configured by using the second configuration information, the first node does not communicate with the third node. In other words, the flexible slot/symbol configured by using the second configuration information is equivalent to a silent slot.

Optionally, the second configuration information may be dynamic signaling, and the dynamic signaling may be, for example, DCI, a MAC CE, or other dynamic signaling. Further, the DCI may be a DCI format 2-0.

In the existing technology, a base station may configure a slot format of a terminal device by using a DCI format 2-0. According to the conventional technology, a DCI format 2-0 sent by the second node to the first node is used to indicate an actual slot format of a UE function of the first node. In some embodiments of this application, a DCI format 2-0 may be used to indicate the actual slot format of the base station function of the first node. Therefore, the DCI format 2-0 in some embodiments of this application may be considered as a special DCI format 2-0. When the special DCI format 2-0 is configured, a common DCI format 2-0 may be further configured for the second node, to indicate the actual slot format of the UE function of the first node. The first node needs to distinguish a usage of a DCI format 2-0, that is, whether the DCI format 2-0 is used for the base station function or the UE function. The second node may indicate a specific usage of a DCI format 2-0 when configuring the DCI format 2-0 for the first node. When two DCI formats 2-0 of different usages are configured, the two DCI formats 2-0 may use different RNTIs to perform CRC scrambling. In another implementation, a new DCI format may be defined to indicate the actual slot format of the base station function of the first node.

In an embodiment of this application, the second configuration information may indicate only the slot formats of the subset of slots, and does not indicate slot formats of other slots in the first set than the subset of slots, or the second configuration information may indicate slot formats of all the slots in the first set. That the second configuration information is in a special DCI format 2-0 is used as an example. The special DCI format 2-0 may indicate the actual slot format of the base station function of the first node by indicating only the slot formats of the subset of slots instead of indicating the slot formats of the other slots in the first set than the subset of slots, or the special DCI format 2-0 may indicate the actual slot format of the base station function of the first node by indicating the slot formats of all the slots in the first set. It is easy to understand that when the second configuration information is used to indicate the slot formats of all the slots in the first set, the slot formats of the other slots than the subset of slots that are indicated by the second configuration information are the same as the slot formats indicated by the first configuration information. For example, a slot format of the slot 0 indicated by the first configuration information is "1", and when the slot 0 does not belong to the group of the subset of slots, a slot format of the slot 0 indicated by the second configuration information is also "1". Usually, a quantity of slots indicated by the second configuration information is greater than a total quantity of slots included in one single-cycle period or one multi-cycle period. However, this is not limited in embodiments of the present disclosure.

The slot formats of the subset of slots indicated by the second configuration information may be specific to one single-cycle period or one multi-cycle period, or may be specific to a plurality of single-cycle periods or a plurality of multi-cycle periods. For example, after the first node receives the second configuration information, the base station function of the first node may perform sending and receiving in N (N is an integer greater than 1) periods based on the configuration. For another example, after the first node receives the second configuration information, the base station function of the first node may continuously perform sending and receiving in N periods based on the configuration, until the first node receives again signaling that is used to modify slot formats of several slots in the first set.

The slot formats that are of the subset of slots and that are indicated by the second configuration information may be cross-cycle, so that the first node can modify the slot formats of the subset of slots in a timely manner. For example, in FIG. 4, when the length of the second period is P1, it indicates that the slot format is configured in a single-cycle period. When the length of the second period is P2, it indicates that the slot format is configured in a dual-cycle period. The second node may send the second configuration information in the first period, where the second configuration information is used to modify the slot formats of the subset of slots in the second period. In FIG. 4, an indication of the slot format crosses only one period. In another implementation, the indication of the slot format may cross a plurality of periods, and a specific quantity of periods that are crossed may be configured by the second node or the donor node.

In an embodiment of this application, the method may further include the following steps.

S522: The first node sends third configuration information to the third node.

Correspondingly, the third node receives the third configuration information sent by the first node. The third configuration information is used to configure a slot format of the third node.

Step S522 may be performed after S526, or may be performed before S506 and S518.

This is not limited in embodiments of this application.

S526: The third node determines the slot format of the third node based on the third configuration information.

In S522, the first node may send the third configuration information in a broadcast or unicast manner. For example, when the third configuration information is a broadcast message, the broadcast message may be sent in any one of the following three manners:
(1) The donor node of the first node directly makes a decision (or determines) and sends the message to the first node, and then the first node broadcasts the message to a subordinate terminal device or the third node.
(2) The first node makes a decision, and then requests the donor node to encapsulate the message into a broadcast RRC message and send the broadcast RRC message to the first node. Finally, the first node broadcasts the message.
(3) The first node makes a decision and broadcasts the message.

The initial slot format of the base station function of the first node or the actual slot format of the base station function of the first node may be different from the slot format of the third node configured by using the third configuration information. For ease of understanding and description, the initial slot format of the base station function of the first node or the actual slot format of the base station function of the first node is referred to as configuration A below, and the slot format of the third node configured by using the third configuration information is referred to as configuration B.

A transmission direction of an access link of the first node (that is, a link between the first node and a child terminal device) needs to meet requirements of both the configuration A and the configuration B. In other words, when the child terminal device of the first node communicates with the first node, the first node needs to consider both the configuration A and the configuration B, and a child backhaul link of the first node needs to meet at least a requirement of the configuration A, that is, in some scenarios, the child backhaul link of the first node may not meet a requirement of the configuration B.

The slot format configuration in the first period in FIG. 4 is used as an example for description. For the slot 2 in the first period shown in FIG. 4, if the configuration B indicates that the slot is a downlink slot, it is impossible to schedule uplink data for the terminal device in this slot. However, for a child backhaul link, this slot may be a downlink slot or an uplink slot. When only the flexible slot is modified by using the second configuration information, if the configuration A indicates that the slot is a downlink slot, the child backhaul link is also a downlink; if the configuration A indicates that the slot is an uplink slot, uplink transmission can be performed on the child backhaul link; and if the configuration A indicates that the slot is a flexible slot, both the cases may be supported.

It should be noted that the configuration A can be parsed or received only to the first node, and the configuration B can be parsed or received to both the first node and the third node. The first node may send some configurations in the configuration A to the third node by using unicast RRC signaling, or may not send these configurations in the configuration A to the third node.

In the foregoing embodiments, the first node receives only one configuration A at a same moment, and the first node may determine, based on the configuration B, slots that are in the configuration A and that can be used for both the access link and the child backhaul link, and slots that are in the configuration A and that can be used only for the child backhaul link.

In a possible implementation, the first node has different configurations A for the access link of the base station function and the child backhaul link. In other words, the first node may have different configurations A when communicating with the terminal device and a child IAB node.

In a possible implementation, the configuration A and the configuration B use a same period configuration.

In a possible implementation, a silent/flexible slot in the configuration A indicates a slot occupied by a parent backhaul link of the first node.

In a possible implementation, the base station function of the first node may have a plurality of different cells, sectors, or transceiver panels. In this case, the different cells, sectors, or transceiver panels may have different configurations A and configurations B. In the present disclosure, descriptions are provided for only one cell, sector, or transceiver panel of the base station function of the first node. However, a case in which there are a plurality of cells, sectors, or transceiver panels may be applicable to some embodiments of the present disclosure.

Figure 6:
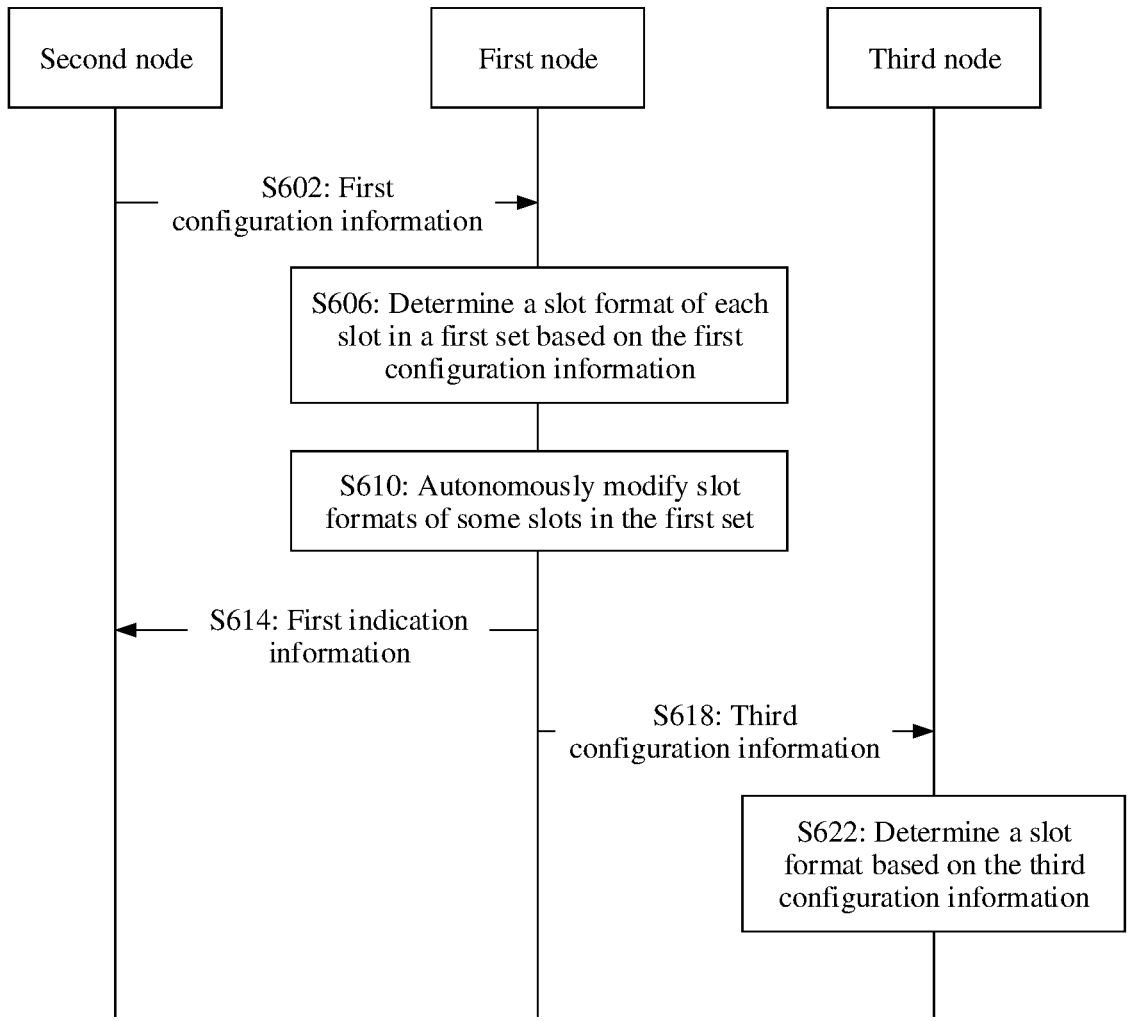
FIG. 6 is a schematic flowchart of another example slot format configuration method according to an embodiment of this application.

FIG. 6 shows another slot format configuration method. In this method, the first node may autonomously modify the slot formats of the subset of slots. The following provides a detailed description with reference to the accompanying drawing.

S602 to S606: The second node sends the first configuration information to the first node, and the first node determines the slot format of each slot in the first set based on the first configuration information. For details, refer to the foregoing descriptions of step S302 and step S306 in the method shown in FIG. 3. Details are not described herein again.

S610: The first node autonomously modifies the slot formats of the subset of slots in the first set.

S614: The first node sends first indication information to the second node. Correspondingly, the second node receives the first indication information sent by the first node.

The first indication information is used to indicate the modified slot formats of the subset of slots. Further, the first indication information may further include an unmodified slot format of one or more slots. The second node may learn of the actual slot format of the base station function of the first node based on the first indication information sent by the first node.

It should be understood that, if the first configuration information is sent by the donor node to the first node by using the second configuration information, after receiving the first indication information, the second node may further send the first indication information to the donor node. However, this is not limited in embodiments of the present disclosure.

Optionally, the first indication information may be carried in uplink control information (UCI). In this way, the second node may learn, in a timely manner, of the slot formats of the subset of slots modified by the first node.

Optionally, similar to a method in which the second configuration information indicates the slot formats of the subset of slots in a cross-cycle manner, the first node may send the first indication information in a cross-cycle manner. Herein, it means that the slot formats indicated by the first indication information are slot formats in a period after a current period (a period in which the first indication information is sent). Usually, the first node may send the first indication information in a slot before the slot configured by using the first configuration information. However, in embodiments of this application, a case in which the first indication information is sent after the slot configured by using the first configuration information is not excluded. When the first indication information is sent before the slot configured by using the first configuration information, the second node may overwrite, by using the foregoing dynamic signaling #1, the slot formats of the subset of slots that are autonomously modified by the first node.

In an embodiment of this application, the method may further include the following steps:

S618 to S622: The first node sends third configuration information to the third node, and the third node determines a slot format based on the third configuration information. For details, refer to the foregoing descriptions of step S522 and step S526 in the method shown in FIG. 5. Details are not described herein again.

In embodiments of this application, because the first node has the two parts: the base station function and the UE function, when configuring the slot format of the base station function of the first node, a slot format configuration of the UE function of the first node needs to be considered.

Figure 7:
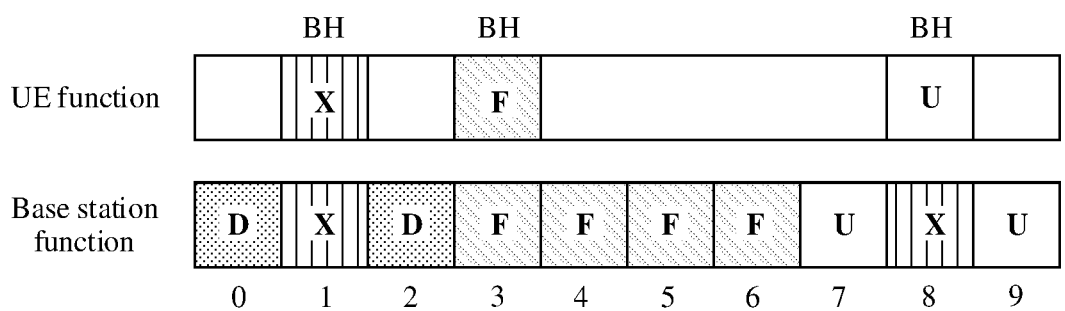
FIG. 7 shows a frame structure according to an embodiment of this application.

Specifically, the first set may include a slot used for a parent backhaul link, or may not include a slot used for a parent backhaul link. This is not limited in embodiments of this application. Specifically, a frame structure of the first node is divided into two parts: the slot format of the UE function of the first node and the slot format of the base station function of the first node (that is, the foregoing configuration A). For example, refer to a frame structure shown in FIG. 7. The frame structure in FIG. 7 is divided into two parts. An upper part is the slot format of the UE function of the first node, and a lower part is the slot format of the base station function of the first node. For the UE function of the first node, because not all slots are configured as backhaul slots (that is, slots used for a backhaul link), only slot formats of a subset of slots are shown in the figure. For the base station function of the first node, at least a slot format of a non-parent backhaul slot (that is, a slot that is not used for a parent backhaul link) should be configured. It should be noted that, although slot 1, slot 3, and slot 8 shown in FIG. 7 are configured as parent backhaul slots (e.g., slots used for parent backhaul links), the slot 1, the slot 3, and the slot 8 may still have a slot format configuration of a base station function. In other words, the first set may include one or more of the slot 1, the slot 3, and the slot 8. A slot denoted as "X" in FIG. 7 indicates that the slot may have a plurality of configurations. For example, the slot 1 may be a downlink slot or a flexible slot, and the slot 8 may be an uplink slot or a flexible slot. For example, when a parent backhaul downlink is not scheduled for the first node in the slot 1, the first node may send downlink data to the third node. Alternatively, the slot 1 of the base station function may be configured as an uplink slot, indicating that in this slot, the first node may receive a downlink signal from a parent node and receive an uplink signal from the third node at the same time, that is, perform spatial multiplexing.

The following describes a scenario in which a parent backhaul slot (e.g., a slot used for a parent backhaul link) and a child backhaul slot (e.g., a slot used for a child backhaul link) are repeated with reference to several examples.

Figure 8:
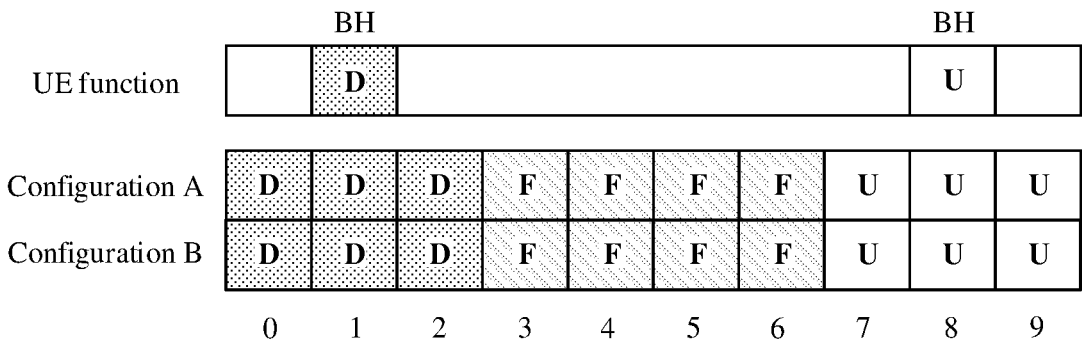
FIG. 8 is a schematic diagram of slot format configurations of a third node, a UE function of a first node, and a base station function of the first node according to an embodiment.

FIG. 8 separately shows non-limiting, example slot format configurations of the UE function of the first node: configuration A and configuration B. The slot 1 and the slot 8 shown in FIG. 7 are respectively configured as a parent backhaul slot and a child backhaul slot.

For the slot 1, both a parent backhaul link and a child backhaul link are downlinks. Therefore, in the slot, the base station function link of the first node does not work (when the parent backhaul slot is scheduled), or the first node sends a downlink signal to a terminal device (when the parent backhaul slot is not scheduled).

For the slot 8, a case is similar to that of the slot 1. In the slot, the base station function of the first node does not work, or the first node receives an uplink signal from the terminal device.

The second node may trigger or prohibit spatial multiplexing by performing slot configuration on the base station function of the first node.

Figure 9:
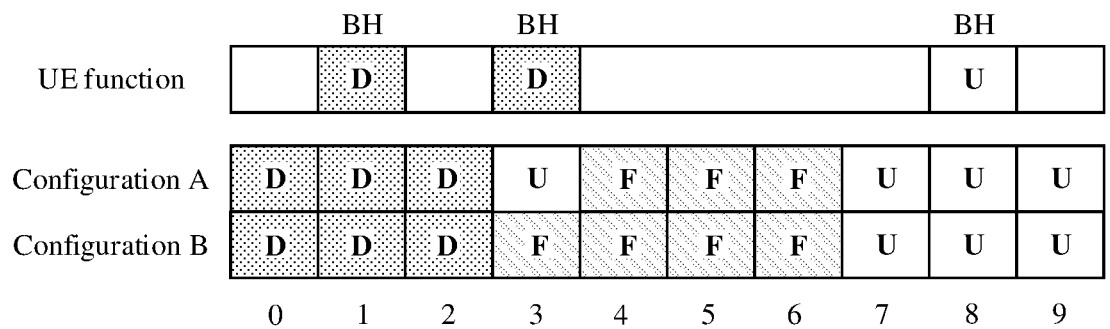
FIG. 9 is a schematic diagram of slot format configurations of a third node, a UE function of a first node, and a base station function of the first node according to an embodiment.
Figure 10:
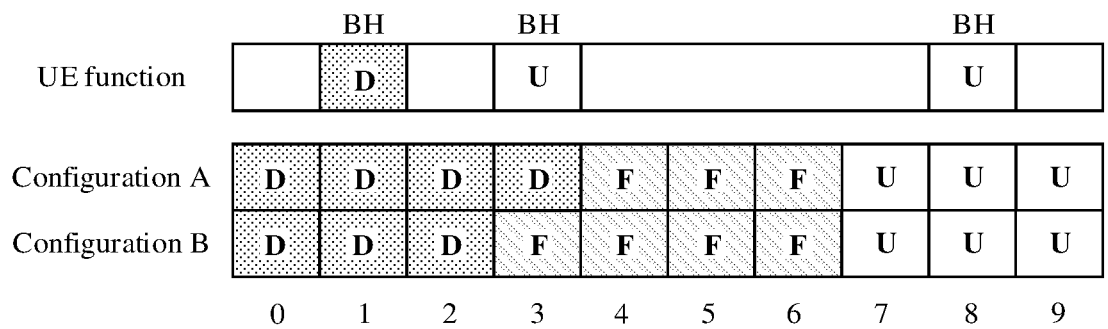
FIG. 10 is a schematic diagram of slot format configurations of a third node, a UE function of a first node, and a base station function of the first node according to an embodiment.

First, a case in which the third node is a terminal device is considered, that is, spatial multiplexing is performed on the parent backhaul link and the access link. Refer to FIG. 9 and FIG. 10. For the slot 1 and the slot 8, a slot configuration of the parent backhaul link and a slot configuration indicated by the configuration B indicate a same direction. Therefore, for the terminal device, spatial multiplexing cannot be performed in the two slots.

The slot 3 is indicated by the configuration B as a flexible slot. Therefore, an actual transmission direction of the slot is variable. For example, as shown in FIG. 9, when the parent backhaul link is a downlink, and the slot format of the base station function of the first node is configured as an uplink slot in this slot, the first node may schedule the terminal device to perform uplink transmission, to implement spatial multiplexing at a receive end. As shown in FIG. 10, when the parent backhaul link is an uplink, and the slot format of the base station function of the first node is configured as a downlink slot in this slot, the first node may schedule the terminal device to perform downlink reception, to implement spatial multiplexing at a transmit end. In a possible implementation, the slot format of the base station function of the first node is configured as a flexible slot in this slot, and the first node may perform spatial multiplexing at the transmit end or the receive end based on scheduling of the parent backhaul link.

Figure 11:
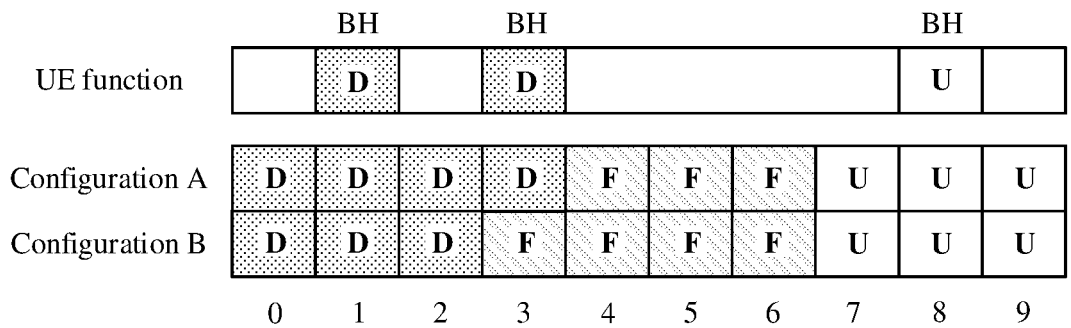
FIG. 11 is a schematic diagram of slot format configurations of a third node, a UE function of a first node, and a base station function of the first node according to an embodiment.
Figure 12:
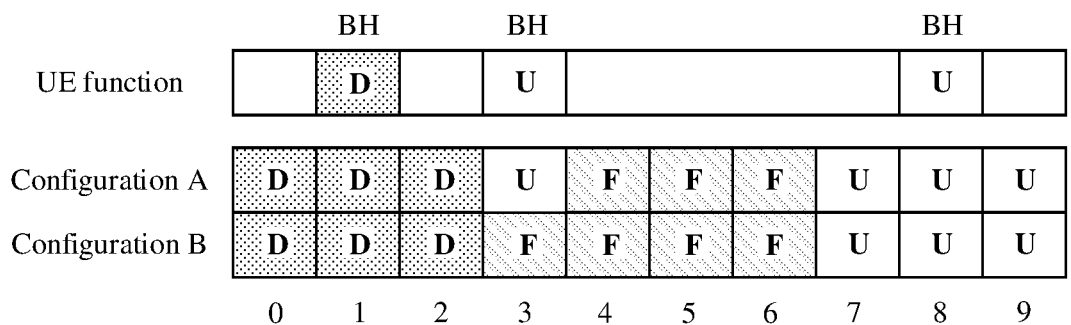
FIG. 12 is a schematic diagram of slot format configurations of a third node, a UE function of a first node, and a base station function of the first node according to an embodiment.

It can be learned from the foregoing content that the second node may prohibit spatial multiplexing by configuring the base station function of the first node. As shown in FIG. 11 and FIG. 12, if a slot format configured by the third node for the base station function of the first node indicates a direction the same as that of the parent backhaul link, the first node cannot perform spatial multiplexing.

In conclusion, when a slot format configured by the second node for the backhaul slot (e.g., a slot used for a backhaul link) of the first node indicates a direction reverse to (or different from) that of an access slot (e.g., a slot used for an access link), it indicates that spatial multiplexing can be performed. Alternatively, when the slot format configured by the second node for the backhaul slot of the first node indicates a direction the same as (or not reverse to) that of the access slot, it indicates that spatial multiplexing cannot be performed.

In another possible implementation, the second node implements no spatial multiplexing in any form by configuring the base station function of the first node. For example, refer to FIG. 11 and FIG. 12, F is configured in the slot 3, indicating that no spatial multiplexing is allowed.

Figure 13:
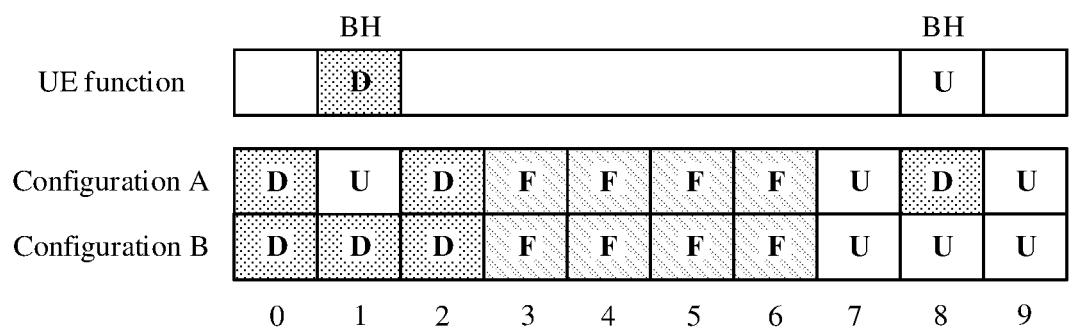
FIG. 13 is a schematic diagram of slot format configurations of a third node, a UE function of a first node, and a base station function of the first node according to an embodiment.

When the third node is an IAB node, the foregoing mechanism may also be used, but a configuration of the child IAB node may not be limited to a broadcast configuration of the base station function. As shown in FIG. 13, although the slot 1 is configured as a downlink slot by using broadcast signaling of the first node, the slot format of the base station function of the first node may be configured as an uplink slot in the slot, indicating that spatial multiplexing can be performed on a downlink of the parent backhaul link and an uplink of the child backhaul link. This rule also applies to the slot 8.

Figure 14:
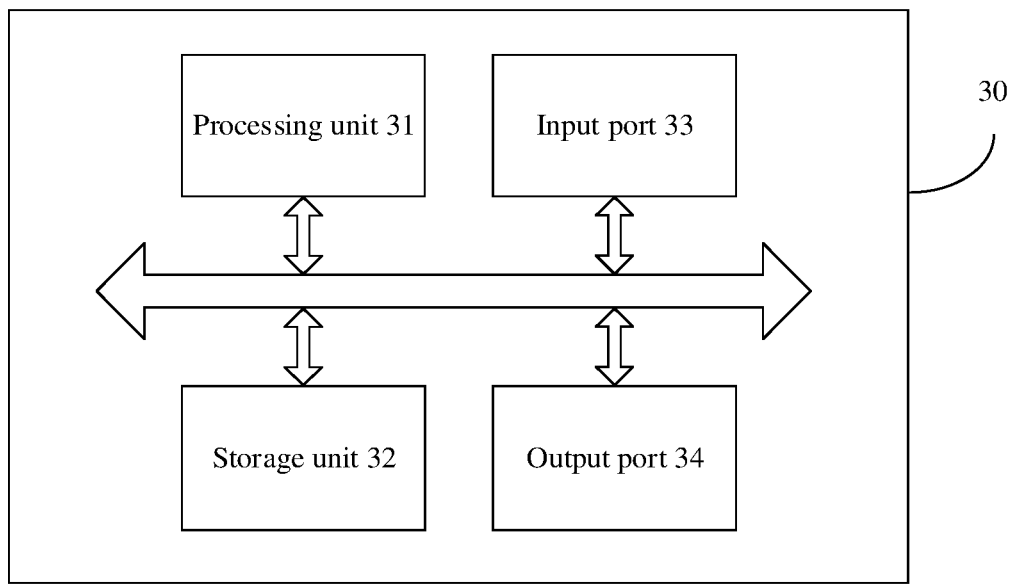
FIG. 14 is a schematic block diagram of an example communications apparatus according to an embodiment.

According to the foregoing method, FIG. 14 is a schematic diagram of a communications apparatus 30 according to an embodiment of this application. The apparatus 30 may be an IAB node or a donor node, or may be a chip or a circuit, for example, a chip or a circuit that may be disposed in an IAB node or a donor node.

The apparatus 30 may include a processing unit 31 and a storage unit 32. The storage unit 32 is configured to store instructions, and the processing unit 31 is configured to execute the instructions stored in the storage unit 32, so that the apparatus 30 implements the steps performed by the IAB node or the donor node in the foregoing methods.

Further, the apparatus 30 may further include an input port 33 (that is, an example of a receiving unit (for example, a first receiving unit or a second receiving unit)) and an output port 34 (that is, another example of the sending unit).

Further, the processing unit 31, the storage unit 32, the input port 33, and the output port 34 (that is, an example of a sending unit (for example, a first sending unit or a second sending unit)) may communicate with each other by using an internal connection path, to transfer a control signal and/or a data signal.

In addition, it may be considered that the communications apparatus provided in certain embodiments of this application is implemented by using a general-purpose computer. To be specific, program code that is used to implement functions of the processing unit 31, the input port 33, and the output port 34 is stored in the storage unit 32, and a general-purpose processing unit executes the code in the storage unit 32 to implement the functions of the processing unit 31, the input port 33, and the output port 34.

The storage unit 32 is configured to store a computer program.

In an implementation, the processing unit 31 may be configured to: invoke the computer program from the storage unit 32 and run the computer program, to control the input port 33 to receive first configuration information sent by a second node, where the second node is a parent node of the communications apparatus; determine a slot format of each slot in a first set of slots based on the first configuration information, where the first set includes slots that are used for communication between the communications apparatus and a third node in one or more periods, the third node is a child integrated access and backhaul (IAB) node of the communications apparatus or a terminal device served by the communications apparatus, the slot format indicates a type of each symbol in a slot, and the type of the symbol includes at least an uplink symbol and a downlink symbol; and modify slot formats of a subset of slots of the first set to obtain modified slot formats of the subset of slots.

Optionally, the processing unit 31 may further control the input port 33 to receive second configuration information sent by the second node, where the second configuration information is used to reconfigure the slot formats of the subset of slots. The processing unit 31 may modify the slot formats of the subset of slots based on the second configuration information.

Optionally, the second configuration information is dynamic signaling.

Optionally, the processing unit 31 may further control the output port 34 to send a requirement report message to the second node, where the requirement report message is used to indicate an uplink-downlink configuration that the communications apparatus expects to use to perform communication with the third node.

Optionally, the processing unit 31 may further control the output port 34 to send first indication information to the second node, where the first indication information is used to indicate the modified slot formats of the subset of slots.

Optionally, the type of the symbol further includes a flexible symbol and/or a silent symbol, the flexible symbol configured by using the first configuration information refers to a symbol whose transmission direction is not determined, and the communications apparatus does not communicate with the third node on the silent symbol.

Optionally, the processing unit 31 is specifically configured to:

modify a slot format of a slot in which the flexible symbol configured by using the first configuration information is located, where the flexible symbol configured by using the first configuration information refers to a symbol whose transmission direction is not determined.

The foregoing listed functions and actions of the modules or the units in the apparatus 30 are merely examples for description. The modules or the units in the apparatus 30 may be configured to perform actions or processes performed by the first node in the foregoing method. To avoid repetition, detailed descriptions are omitted herein.

In another implementation, the processing unit 31 may be configured to: determine a slot format of each slot in a first set of slots, where the first set includes slots that are used for communication between a first node and a third node in one or more periods, the third node is a child integrated access and backhaul (IAB) node of the first node or a terminal device served by the first node, the slot format indicates a type of each symbol in a slot, and the type of the symbol includes at least an uplink symbol and a downlink symbol; and invoke the computer program from the storage unit 32 and run the computer program, to control the output port 34 to send first configuration information to the first node, where the first configuration information is used to indicate the slot format of each slot in the first set.

Optionally, the processing unit 31 may further control the output port 34 to send second configuration information to the first node, where the second configuration information is used to modify slot formats of a subset of slots in the first set.

Optionally, the processing unit 31 may further control the input port 33 to receive a requirement report message sent by the first node, where the requirement report message is used to indicate an uplink-downlink configuration that the first node expects to use to perform communication with the third node.

Optionally, the processing unit 31 may further control the input port 33 to receive first indication information sent by the first node, where the first indication information is used to indicate modified slot formats of the subset of slots in the first set.

Optionally, the subset of slots are slots in which flexible symbols configured by using the first configuration information are located, and the flexible symbols configured by using the first configuration information refer to symbols whose transmission directions are not determined.

The foregoing listed functions and actions of the modules or the units in the apparatus 30 are merely examples for description. The modules or the units in the apparatus 30 may be configured to perform actions or processes performed by the second node in the foregoing method. To avoid repetition, detailed descriptions are omitted herein.

For concepts, explanations, detailed descriptions, and other steps of the apparatus 30 that are related to the technical solutions provided in the embodiments of this application, refer to the descriptions of the content in the foregoing methods or other embodiments. Details are not described herein again.

Figure 15:
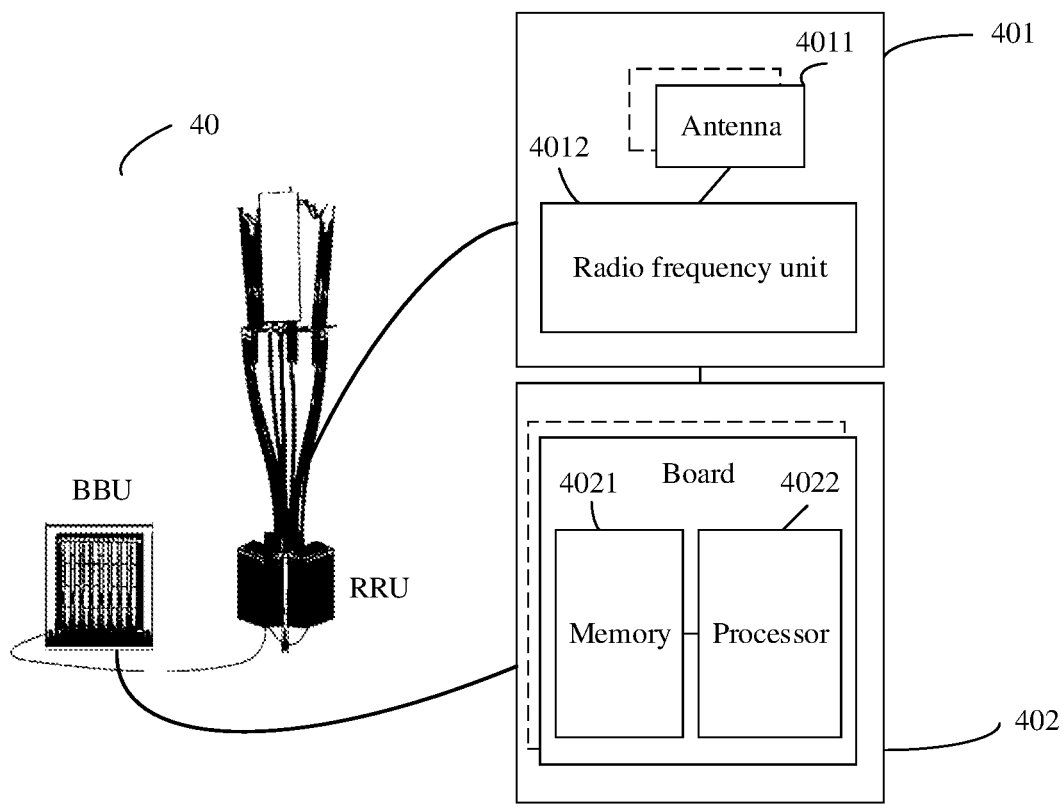
FIG. 15 is a schematic block diagram of an example network device according to an embodiment.

FIG. 15 is a schematic structural diagram of a network device 40 (e.g., a base station) according to an embodiment of this application. The network device 40 may be configured to implement a function of the first node or the second node in the foregoing method. The network device 40 includes one or more radio frequency units, such as a remote radio unit (RRU) 401 and one or more baseband units (BBU) (which may also be referred to as digital units, DUs) 402. The RRU 401 may be referred to as a transceiver unit, a transceiver circuit, a transceiver, or the like, and may include at least one antenna 4011 and a radio frequency unit 4012. The RRU 401 is mainly configured to: send and receive a radio frequency signal, and perform conversion between the radio frequency signal and a baseband signal, for example, configured to send the signaling message in the foregoing embodiments to a terminal device. The BBU 402 is mainly configured to: perform baseband processing, control a base station, and so on. The RRU 401 and the BBU 402 may be physically disposed together, or may be physically separate, to be specific, may be disposed in a distributed base station.

The BBU 402 is a control center of the base station, may also be referred to as a processing unit, and is mainly configured to implement a baseband processing function, for example, channel coding, multiplexing, modulation, and spreading. For example, the BBU (the processing unit) 402 may be configured to control the network device (e.g., a base station) 40 to perform an operation procedure related to the first node or the second node in the foregoing method embodiments.

In an example, the BBU 402 may include one or more boards, and a plurality of boards may jointly support a radio access network (such as an LTE system or a 5G system) of a single access standard, or may separately support radio access networks of different access standards. The BBU 402 further includes a memory 4021 and a processor 4022. The memory 4021 is configured to store one or more necessary instructions and necessary data. For example, the memory 4021 stores the codebook and the like in the foregoing embodiments. The processor 4022 is configured to control the network device 40 to perform a necessary action, for example, control the network device 40 to perform the operation procedure related to the first node or the second node in the foregoing method embodiments. The memory 4021 and the processor 4022 may serve the one or more boards. In other words, a memory and a processor may be independently disposed on each board. Alternatively, a plurality of boards may share a same memory and a same processor. In addition, a necessary circuit may further be disposed on each board.

In a possible implementation, with development of a system-on-a-chip (SoC) technology, all or some functions of the BBU 402 and the RRU 401 may be implemented through the SoC technology, for example, implemented through a base station function chip. The base station function chip integrates components such as a processor, a memory, and an antenna port. A program of a base station-related function is stored in the memory. The processor executes the program to implement the base station-related function. Optionally, the base station function chip can also read a memory outside the chip to implement the base station-related function.

It should be understood that the structure of the network device shown in FIG. 15 is merely a possible form, and should not constitute any limitation on the embodiments of this application. This application does not exclude a possibility of another form of base station structure that may emerge in the future.

According to the method provided in the embodiments of this application, an embodiment of this application further provides a communications system, including the foregoing first node, the foregoing second node, and the foregoing third node. Optionally, the communications system may further include a donor node.

It should be understood that, the processor in the embodiments of this application may be a central processing unit (CPU), or may alternatively be another general-purpose processor, a digital signal processor (DSP), an application-specific integrated circuit (ASIC), a field programmable gate array (FPGA) or another programmable logical device, a discrete gate or transistor logical device, a discrete hardware component, or the like. The general-purpose processor may be a microprocessor, any conventional processor, or the like.

It may further be understood that the memory in the embodiments of this application may be a volatile memory or a nonvolatile memory, or may include a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM) that is used as an external cache. As examples rather than limitative descriptions, many forms of random access memories (RAM) may be used, for example, a static random access memory (SRAM), a dynamic random access memory (DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM).

All or some of the foregoing embodiments may be implemented by software, hardware, firmware, or any combination thereof. When software is used to implement the embodiments, all or some of the foregoing embodiments may be implemented in a form of a computer program product. The computer program product includes one or more computer instructions or computer programs. When the program instructions or the computer programs are loaded and executed on the computer, the procedures or the functions according to the embodiments of this application are all or partially generated. The computer may be a general-purpose computer, a special-purpose computer, a computer network, or another programmable apparatus. The computer instructions may be stored in a computer-readable storage medium or may be transmitted from one computer-readable storage medium to another computer-readable storage medium. For example, the computer instructions may be transmitted from one website, computer, server, or data center to another website, computer, server, or data center in a wired (for example, infrared, radio, and microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), or a semiconductor medium. The semiconductor medium may be a solid-state drive.

It should be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that sequence numbers of the foregoing processes do not mean execution sequences in various embodiments of this application. The execution sequences of the processes should be determined based on functions and internal logic of the processes, and should not be construed as any limitation on the implementation processes of the embodiments of this application.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application. A person skilled in the art may clearly understand that, for the purpose of convenient and brief description, for a detailed working process of the foregoing system, apparatus, and unit, refer to a corresponding process in the foregoing method embodiments, and details are not described herein again. In the several embodiments provided in this application, it should be understood that the disclosed system, apparatus, and method may be implemented in other manners. For example, the described apparatus embodiments are merely examples. For example, the unit division is merely logical function division and there may be another division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or another form.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments. In addition, functional units in the embodiments of this application may be integrated into one processing unit, or each of the units may exist alone physically, or two or more units may be integrated into one unit. When the functions are implemented in a form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The foregoing storage medium includes: any medium that can store program code, such as a USB flash drive, a removable hard disk, a read-only memory, a random access memory, a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A slot format configuration method, comprising:
    receiving, by a first node, first configuration information from a second node, wherein the second node is a parent node of the first node;
    determining, by the first node, a slot format of each slot in a first set of slots based on the first configuration information, wherein the first set of slots comprises slots that are used for communication between the first node and a third node in one or more periods, the third node is a child integrated access and backhaul (IAB) node of the first node or a terminal device served by the first node, and the slot format of each of the slots indicates a type of each symbol in the slot;
    receiving, by the first node, second configuration information from the second node, wherein the second configuration information is used to reconfigure slot formats of a subset of slots of the first set of slots; and
    modifying, by the first node, the slot formats of the subset of slots of the first set of slots based on the second configuration information, to obtain modified slot formats of the subset of slots.

2. The method according to claim 1, wherein the second configuration information is dynamic signaling.

3. The method according to claim 1, further comprising:
    sending, by the first node, a requirement report message to the second node, wherein the requirement report message indicates an uplink-downlink configuration that the first node expects to use to perform communication with the third node.

4. The method according to claim 1, wherein the type of each symbol in each of the slots is selected from a plurality of possible types of symbols, the plurality of possible types of symbols further comprise a flexible symbol and/or a silent symbol, the flexible symbol is configured by using the first configuration information, the flexible symbol refers to a symbol whose transmission direction is not determined, the silent symbol indicates that the first node does not communicate with the third node, the subset of slots are one or more slots each has at least one flexible symbol, and the slot formats of the subset of slots are modified by modifying one or more flexible symbols in the subset of slots to one or more uplink symbols, one or more downlink symbols, and/or one or more silent symbols.

5. A slot format configuration method, comprising:
   determining, by a second node, a slot format of each slot in a first set of slots, wherein the first set of slots comprises slots that are used for communication between a first node and a third node in one or more periods, the third node is a child integrated access and backhaul (IAB) node of the first node or a terminal device served by the first node, and the slot format of each of the slots indicates a type of each symbol in the slot;
   sending, by the second node, first configuration information to the first node, wherein the first configuration information indicates the slot format of each slot in the first set of slots; and
   sending, by the second node, second configuration information to the first node, wherein the second configuration information is used by the first node to modify slot formats of a subset of slots of the first set of slots to obtain modified slot formats of the subset of slots.

6. The method according to claim 5, further comprising:
   before the sending, by the second node, second configuration information to the first node,
   receiving, by the second node, a requirement report message from by the first node,
   wherein the requirement report message indicates an uplink-downlink configuration that the first node expects to use to perform communication with the third node.

7. The method according to claim 5, further comprising:
   receiving, by the second node, first indication information from the first node, wherein the first indication information indicates modified slot formats of a subset of slots in the first set of slots.

8. The method according to claim 5, wherein the type of each symbol in each of the slots is selected from a plurality of possible types of symbols, the plurality of possible types of symbols further comprises a flexible symbol and/or a silent symbol, the flexible symbol is configured using the first configuration information, the flexible symbol refers to a symbol whose transmission direction is not determined, and the silent symbol indicates that the first node does not communicate with the third node.

9. A communications apparatus, comprising:
   a receiver, configured to receive first configuration information from a second node, wherein the second node is a parent node of the communications apparatus; and
   at least one processor, configured to determine a slot format of each slot in a first set of slots based on the first configuration information, wherein the first set of slots comprises slots that are used for communication between the communications apparatus and a third node in one or more periods, the third node is a child integrated access and backhaul (IAB) node of the communications apparatus or a terminal device served by the communications apparatus, and the slot format of each of the slots indicates a type of each symbol in the slot, wherein
   wherein the receiver is further configured to receive second configuration information from the second node, wherein the second configuration information is used to reconfigure slot formats of a subset of slots of the first set of slots, and
   the at least one processor is further configured to modify the slot formats of the subset of slots of the first set of slots based on the second configuration information to obtain modified slot formats of the subset of slots.

10. The communications apparatus according to claim 9, wherein the second configuration information is dynamic signaling.

11. The communications apparatus according to claim 9, further comprising:
    a transmitter, configured to send a requirement report message to the second node, wherein the requirement report message indicates an uplink-downlink configuration that the communications apparatus expects to use to perform communication with the third node.

12. The communications apparatus according to claim 9, wherein the type of each symbol in each of the slots is selected from a plurality of possible types of symbols, the plurality of possible types of symbols further comprise a flexible symbol and/or a silent symbol, the flexible symbol is configured using the first configuration information, the flexible symbol refers to a symbol whose transmission direction is not determined, the silent symbol indicates that the communications apparatus does not communicate with the third node, the subset of slots are one or more slots each has at least one flexible symbol, and the slot formats of the subset of slots are modified by modifying one or more flexible symbols in the subset of slots to one or more uplink symbols, one or more downlink symbols, and/or one or more silent symbols.

13. A communications apparatus, comprising:
    at least ones processor, configured to determine a slot format of each slot in a first set of slots, wherein the first set of slots comprises slots that are used for communication between a first node and a third node in one or more periods, the third node is a child integrated access and backhaul (IAB) node of the first node or a terminal device served by the first node, and the slot format of each of the slots indicates a type of each symbol in the slot; and
    a transmitter, configured to send first configuration information to the first node, wherein the first configuration information indicates the slot format of each slot in the first set of slots, and send second configuration information to the first node, wherein the second configuration information is used by the first node to modify slot formats of a subset of slots of the first set of slots to obtain modified slot formats of the subset of slots.

14. The communications apparatus according to claim 13, further comprising:
    a receiver, configured to receive a requirement report message from the first node, wherein the requirement report message indicates an uplink-downlink configuration that the first node expects to use to perform communication with the third node.

15. The communications apparatus according to claim 14, wherein the receiver is further configured to receive first indication information from the first node, wherein the first indication information indicates modified slot formats of a subset of slots in the first set of slots.

16. The communications apparatus according to claim 13, wherein the type of each symbol in each of the slots is selected from a plurality of possible types of symbols, the plurality of possible types of symbols further comprises a flexible symbol, the subset of slots are slots in which flexible symbols are located, the flexible symbols are configured using the first configuration information, and the flexible symbols refer to symbols whose transmission directions are not determined.

\* \* \* \* \*

UNITED STATES PATENT AND TRADEMARK OFFICE
CERTIFICATE OF CORRECTION

PATENT NO. : 11,916,663 B2
APPLICATION NO. : 17/213287
DATED : February 27, 2024
INVENTOR(S) : Fengwei Liu Page 1 of 1

It is certified that error appears in the above-identified patent and that said Letters Patent is hereby corrected as shown below:

In the Specification

Column 25, Line 24, change "I" to --/--;

In the Claims

Column 27, Claim 6, Line 5, change "from by the first node" to --from the first node--; and Column 28, Claim 13, Line 2, change "at least ones" to --at least one--.

Signed and Sealed this
Twenty-sixth Day of March, 2024

*Katherine Kelly Vidal*

Katherine Kelly Vidal
*Director of the United States Patent and Trademark Office*